United States Patent Office 3,074,915
Patented Jan. 22, 1963

3,074,915
DIELS-ALDER POLYMERS
Sui-Wu Chow, Montclair, N.J., assignor to Union Carbide Corporation, a corporation of New York
No Drawing. Filed June 26, 1959, Ser. No. 823,000
9 Claims. (Cl. 260—78)

This invention relates to novel polymers of an N,N'-bis-maleimide and an aryl substituted alpha pyrone, and to a method for their production. More particularly, this invention concerns tough, high softening point thermoplastic polymeric products made by the reaction of an N,N'-bis-maleimide represented by the general formula:

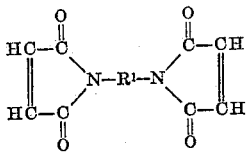

wherein $R^1$ represents a divalent hydrocarbon group such as an alkylene, arylene, aralkylene, or alkarylene group, with a substituted alpha pyrone represented by the general formula:

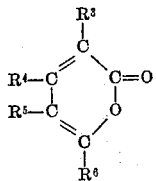

wherein $R^3$ and $R^5$ represent halogen, hydrogen, alkyl or carbalkoxy groups and $R^4$ and $R^6$ represent halogen, aryl or substituted aryl groups. The reaction is accomplished by heating a mixture of the two monomers in an inert halogenated hydrocarbon solvent to an elevated temperature sufficient to initiate the evolution of carbon dioxide and maintaining the reaction mixture at the elevated temperature until polymerization is substantially complete.

A noticeable evolution of carbon dioxide accompanies the reaction. This has led me to believe that the two monomers first condense into a Diels-Alder adduct from which carbon dioxide splits off, and the resultant compound polymerizes to produce the polymeric product. The reactions are believed to go according to the following simplified scheme wherein $R^1$, $R^3$, $R^4$, $R^5$ and $R^6$ have the significance above:

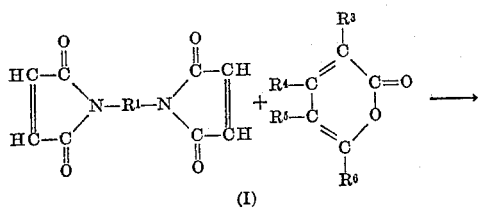

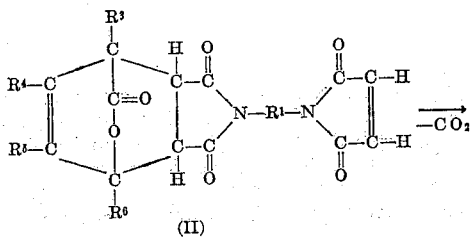

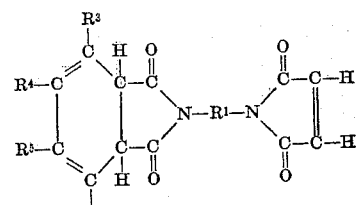

which adduct is believed to polymerize into the following structure:

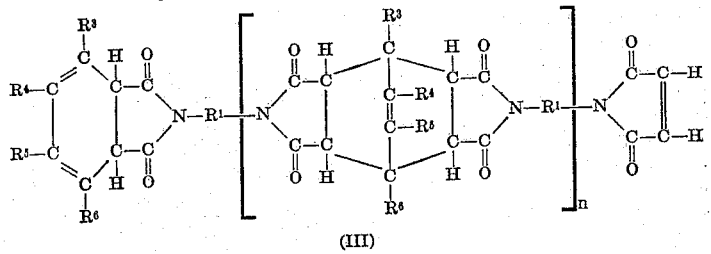

wherein $n$ represents an integer such that the products have a molecular weight sufficient to give the polymer a minimum reduced viscosity of about 0.01 at 25° C. as a 0.2 gram sample in 100 ml. of dimethylformamide. Reduced viscosity methods are prefered for convenience sake to indicate the degree of polymerization of the product and are used throughout the present specification and claims.

It will be noted that the above reaction scheme is shown for equimolar amounts of monomers. However, it is not necessary in the practice of my invention to employ only equimolar amounts of the monomers. I have found, however, that the use of such amounts produces the highest molecular weight products. Polymers made employing a greater mole percent of one or other of the monomers have a commensurately reduced average molecular weight. Both terminal groups of a product made using a stoichiometric excess of a monomer are of the monomer used in the greater amount rather than divided between the monomers as shown above (III). The use of extreme proportions of monomers produces only lower molecular weight resins and these in very low yields and hence is generally not to be desired.

The products of the reaction of my invention which I have found to be widely useful resins are those having reduced viscosities of at least 0.1 to about 0.9 and higher. The more desirable polymers from a usefulness standpoint are those having reduced viscosities of about 0.3 and higher. In order to achieve these preferred reduced viscosities, the N,N-bis-maleimide and alpha pyrone are employed in approximately equimolar amounts.

The N,N'-bis-maleimides useful in this invention are conveniently prepared from maleic anhydride and a diamine in a manner such as described in U.S. Patent 2,444,536. This process includes the steps of reacting maleic anhydride with an appropriate diamine to yield a bis-maleamic acid according to the following reaction scheme.

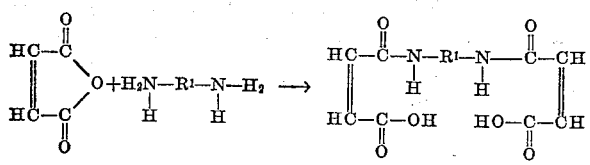

wherein $R^1$ is a divalent hydrocarbon group such as an alkylene, arylene, aralkylene, or alkyarylene group and substituted derivatives thereof. The maleamic acid formed is then reacted with acetic anhydride and anhydrous sodium acetate to yield the desired N,N'-bis-maleimide, according to the following scheme:

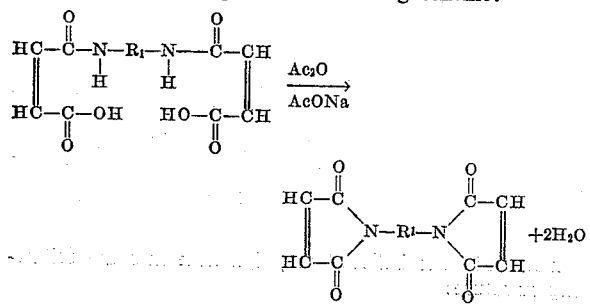

Bis-maleimides prepared in any other manner are also useful in this process.

Obviously, the diamine employed in the preparation of the bis-maleimide determines the divalent radical connecting the maleimide groups, designated as $R^1$. Since the $R^1$ group does not enter into the reaction, it can be any aliphatic or aromatic hydrocarbon group such as alkylene, arylene, alkarylene, and aralkylene groups and substituted derivatives thereof, preferably containing from 1 to about 20 carbon atoms or more without affecting the character of the reaction. For instance, $R^1$ can be methylene, ethylene, propylene, butylene, hexamethylene, decamethylene, phenylene, biphenylene, tolylene, ditolylene, a xylylene group, a diphenyl methane group, or alkyl substituted diphenyl methane groups such as tetramethyl diphenyl methane, diphenyl propane, diethyl diphenyl methane, or naphthalene groups and alkyl derivatives thereof, and like compounds.

The alpha pyrones suitably employed in producing the novel polymeric products of this invention can be represented by the following general formula:

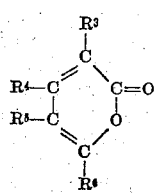

wherein $R^3$ and $R^5$ can be halogen, hydrogen, alkyl, or carbalkoxy groups and $R^4$ and $R^6$ represent halogen, aryl or substituted aryl groups. Typical suitable compounds are 4,6-diphenyl-5-carbethoxy-2-pyrone; 4,6-diphenyl - 3-carbethoxy-2-pyrone; 4-phenyl-6-methyl-2-pyrone; 4-ethyl-5-methyl-6-phenyl-2-pyrone; 3-carbethoxy-4-ethyl-5-methyl-6-phenyl-2-pyrone; 4-methyl-6-phenyl-2-pyrone; 4,6-diphenyl-2-pyrone; and 3,4,5,6-tetrachloro-2-pyrone (perchlorocoumalin). 4,6-diphenyl-2-pyrone can be prepared from ethyl benzoylacetate as described by F. Arndt and B. Eistert in Ber. 58, 2318 (1925).

It is not necessary to provide a fluid reaction medium but it is preferred that a solvent be employed although in as low amounts as possible. Generally, the greater the monomer concentration in the solvent, the more rapid is the reaction and the higher the reduced viscosity of the resulting polymer. If insufficient solvent is employed, the reaction mixture is difficult, if not impossible, to stir, and to maintain at a uniform reaction temperature. Incomplete reaction or side reactions occur if solvent concentration is too low, resulting in lower yields of lower molecular weight polymers. Thus, solvent content of the reaction mixture has an influence on the molecular weight of the polymer produced. Ideal solvent concentration depends on the products desired and the individual reactants employed. In most applications, it is desired that the concentration with respect to each of the monomers be kept in the range of about 0.2 to 1.0 molar, preferably closer to the latter concentration. When gelation of the polymer in the reaction mixture occurs, a higher solvent concentration is indicated desirable.

Suitable solvents are those inert to the monomers and product and in which both the monomers and polymeric products are soluble. Halogenated hydrocarbons, particularly the chlorinated and brominated aliphatic compounds having boiling points of about 80°–150° C. have been found to be very effective for this purpose and are preferred. Solvents such as sym-tetrachloroethane, 1,1,3-trichloroethane, 1,2-dichloroethane and the like are particularly desirable solvents. By dissolving the monomers in the solvent and heating to the reflux temperature of the mixture, the reaction temperature is easily controlled.

Although when the monomer concentration in the solvent is kept high a reaction time of 30 to 60 minutes is generally all that is necessary for substantially complete reaction, polymeric products obtained in my invention are stable at refluxing temperatures for substantially more extended reaction times. Generally speaking, the higher concentrations of monomer are to be preferred since more rapid rates of polymerization and higher reduced viscosity products are obtained therewith. The time required for the polymerization depends ultimately on the particular monomers employed, the reduced viscosity desired in the polymer and the reaction temperature.

Reaction system temperatures at atmospheric pressure up to about 150° C. or less are preferred. The reaction temperature can be controlled by pressure, vacuum or other external or internal means of temperature regulation.

Recovery of the polymer produced in the reaction is readily accomplished by precipitation in a suitable coagulent such as excess methanol, followed by washing, filtering, and drying. Nearly quantitative yields, i.e., about 95–100 percent of polymer are secured. Coagulation methods for recovering the product are preferred, although other methods for recovery can be used as for instance, stripping the solvent off under reduced pressures.

The products of this invention are white to tan, hard, tough, thermoplastic polymers having high softening points, generally at least 150° C. and more commonly closer to 300° C. or above. The products obtained from the aromatic bis-maleimides generally have higher softening temperatures than do those from the aliphatic bis-maleimides, ranging generally from 300° C. to 500° C. All resin products of this invention are soluble in most halogenated hydrocarbon solvents, such as tetrachloroethane, tetrachloroethane/phenol mixtures and in dimethylformamide. The lower softening polymers can be compression molded at temperatures of about 250° C., or cast into sheets or films from solution. The higher softening polymers are suitably cast from solution. The polymers are non-crystalline and generally have a second order transition temperature at about their softening temperatures.

Other interesting properties of these polymeric products suggest many specific applications. While the polymers produced are not too suited to compression molding at low temperatures, films can be prepared from the polymer by dissolving the polymer in a solvent and casting the solution onto a glass plate or other suitable hard, flat surface. Films of these polymers have exceptionally high tensile strengths for non-crystalline polymers, and have excellent electrical properties and good resistance to dilute alkali and acid solutions. Degradation even at temperatures of 200° C. or higher is very slow, making these polymers ideal for high temperature electrical work such as in electrical motors, insulating tapes and electronic tubes and also as varnishes for insulating materials for high temperature applications.

In order to more fully set forth the practice and advantages of my invention, the following examples which are intended as illustrative and not limitative, are presented.

EXAMPLES 1–2

An equimolar mixture of an alpha-pyrone and an N,N′-bis-maleimide was heated in a solvent with stirring under an argon atmosphere. At the end of the reaction, the polymer produced was precipitated by pouring the reaction mixture into excess methanol. The product was then washed with methanol and dried at temperatures below 90° C. in vacuo. The monomers used in the examples are given in Table I below. Also given in Table I are the reduced viscosities of the polymers, and the reaction conditions under which they were produced.

Film was cast from a 20–30% by weight dimethylformamide solution of the product of Example 2 onto a glass plate and dried at 90° C. Tensile properties of the film were measured and are given in Table II below.

TABLE I

*Polymerization of 4,6-Diphenyl-2-Pyrone With N,N′- (4,4′-Diphenylmethane) Bis-maleimide*

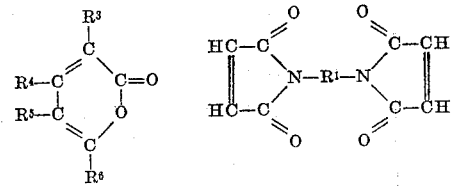

| Ex. | Alpha pyrone | Bis-maleimide | Solvent |
|---|---|---|---|
| 1 | $R^4=R^6=C_6H_5$ | $R^1=$ <img>-CH_2-</img> | S-tetrachloroethane. |
| 2 | $R^4=R^6=C_6H_5$ | $R^1=$ <img>-CH_2-</img> | Do. |

| Example | Reaction temp., °C. | Monomer concentration [1] | Reaction time, hr. | R.V.[2] | Polymer yield, percent |
|---|---|---|---|---|---|
| 1 | 146 | 0.75M | 16 | 0.29 | 92 |
| 2 | 146 | 1.0M | 16 | 0.44 | 98 |

[1] Mole of each monomer reactant present.
[2] Reduced viscosities (R.V.) were determined on 200 mg. of the polymer in 100 ml. of dimethylformamide at 25° C.

TABLE II

Tensile properties of:

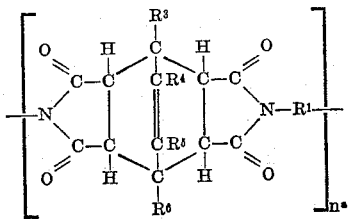

| Ex. | $R^3$ | $R^4$ | $R^5$ | $R^6$ | $R^1$ |
|---|---|---|---|---|---|
| 2 | H | $C_6H_5$ | H | $C_6H_5$ | <img>-CH_2-</img> |

| Ex. | Tensile modulus (p.s.i.) | Tensile strength 25° C. at (p.s.i.) | Elongation (percent) at 25° C. |
|---|---|---|---|
| 2 | 300,000 (25° C.), 20,000 (325° C.) | 10,000 | 20 |

\* Wherein $n$ represents an integer such that the products have a molecular weight sufficient to give a reduced viscosity of from about 0.01 to 0.9 and higher measured at 25° C. as a 0.2 gram sample in 100 ml. of dimethylformamide.

EXAMPLE 3

An equimolar mixture of perchlorocoumalin and the bis-maleimide in a solvent was heated in an argon atmosphere with stirring. The polymer was isolated by precipitation in methanol and reduced viscosities of the polymers were determined in dimethylformamide at 25° C. The experimental conditions and results are summarized in Table III. The polymer consists essentially of units having the structural formula

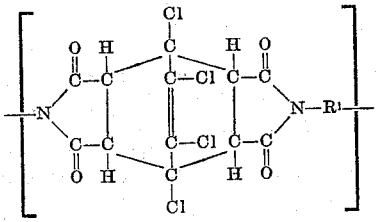

wherein $R^1$ is the hydrocarbon residue of the indicated bis-maleimide shown in Table III.

TABLE III

*Polymerization of Perchlorocoumalin With Bis-Maleimides*

| Bis-maleimide | Solvent | Time | Temp. | R.V.[1] |
|---|---|---|---|---|
| N,N′-hexamethylene | α-Chloronaphthalene. | ½ hr. | Reflux | 0.14 |
| Do | 3:2-phenol-s-tetrachloroethane | 24 hrs. | do | 0.15 |
| N,N′-(4,4′-diphenylmethane). | None | 1 hr. | 170° | 0.15 |
| Do | 2:1-s-tetrachloroethane phenol | 6 hrs. | Reflux | 0.12 |

[1] Reduced viscosities (R.V.) were determined on 200 mg. of the polymer in 100 ml. of dimethylformamide at 25° C.

What is claimed is:

1. A process for preparing a high softening point thermoplastic polymeric product which comprises heating together approximately equimolar amounts of an N,N′-bis-maleimide having the general formula:

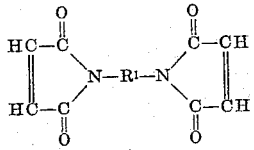

wherein $R^1$ is a divalent hydrocarbon, and an alpha pyrone having the general formula:

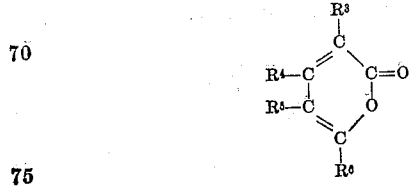

wherein $R^3$ and $R^5$ represent a member selected from the group consisting of chlorine, hydrogen, lower alkyl, and carbalkoxy groups and $R^4$ and $R^6$ represent a member selected from the group consisting of chlorine and aryl groups to a temperature sufficient to cause evolution of carbon dioxide.

2. A process for preparing a high softening point thermoplastic polymeric product which comprises heating, in the presence of an inert solvent for reactants and products to provide a liquid reaction medium approximately equimolar amounts of, an N,N'-bis-maleimide having the general formula:

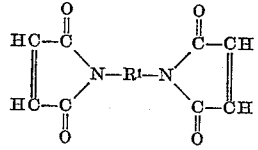

wherein $R^1$ is a divalent hydrocarbon, with an alpha pyrone having the general formula:

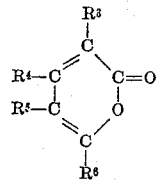

wherein $R^3$ and $R^5$ represent a member selected from the group consisting of chlorine, hydrogen, lower alkyl, and carbalkoxy groups and $R^4$ and $R^6$ represent a member selected from the group consisting of chlorine and aryl groups to a temperature sufficient to cause evolution of carbon dioxide.

3. A process for preparing a high softening point thermoplastic polymeric product which comprises heating in the presence of an inert halogenated hydrocarbon solvent to provide a liquid reaction medium, 0.2 to 1.0 mole/liter of said solvent of an N,N'-bis-maleimide having the general formula:

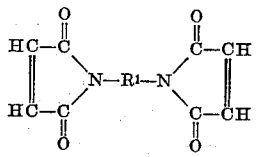

wherein $R^1$ is a divalent hydrocarbon, per 0.2 to 1.0 mole/liter of said solvent of an alpha pyrone having the general formula:

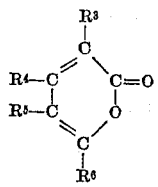

wherein $R^3$ and $R^5$ represent a member selected from the group consisting of chlorine, hydrogen, lower alkyl, and carbalkoxy groups and $R^4$ and $R^6$ represent a member selected from the groups consisting of chlorine and aryl groups to a temperature sufficient to cause the evolution of carbon dioxide.

4. A process for preparing a thermoplastic polymeric product which comprises heating, in the presence of an inert halogenated hydrocarbon solvent for reactants and products to provide a liquid reaction medium, an N,N'-bis-maleimide having the general formula:

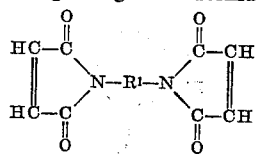

wherein $R^1$ is a divalent hydrocarbon and 4,6-diphenyl-2-pyrone present in about equimolar amounts to a temperature sufficient to cause the evolution of carbon dioxide and recovering the polymer thus produced.

5. The process of claim 4 wherein each of the reactants are present in stoichiometric proportions.

6. A normally solid thermoplastic resinous product consisting essentially of units having the structural formula

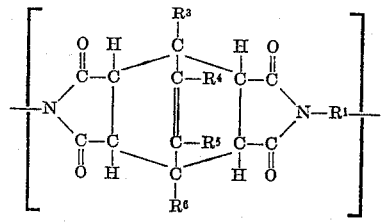

wherein $R^1$ is a divalent hydrocarbon group, $R^3$ and $R^5$ are members selected from the class consisting of chlorine, hydrogen, lower alkyl and carbalkoxy groups and $R^4$ and $R^6$ are members selected from the class consisting of chlorine and aryl groups, with the proviso that at least one of $R^3$ and $R^5$ is a carbalkoxy group, said product being characterized by having a reduced viscosity at 25° C. of at least 0.01 measured as a 0.2 gram sample of the product in 100 ml. of dimethylformamide.

7. A solid thermoplastic resinous product consisting essentially of units having the structural formula

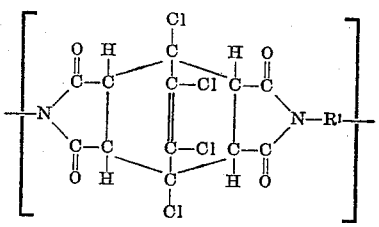

wherein $R^1$ is a divalent radical selected from the group consisting of alkylene, arylene, aralkylene and alkarylene radicals, said product being characterized by having a reduced viscosity at 25° C. of at least 0.01 measured as a 0.2 gram sample of the product in 100 ml. of dimethylformamide.

8. A normally solid thermoplastic resinous product consisting essentially of units having the structural formula

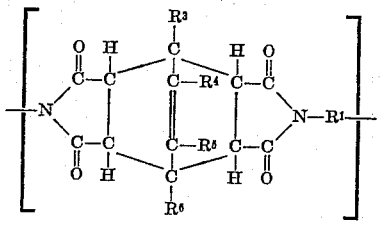

wherein $R^1$ is a divalent hydrocarbon group, $R^3$ and $R^5$ are members selected from the class consisting of chlorine, hydrogen, lower alkyl and carbalkoxy groups and $R^4$ and $R^6$ are members selected from the class consisting of chlorine and aryl groups, with the proviso that at least one of $R^3$, $R^4$, $R^5$ and $R^6$ is a chlorine group, said product being characterized by having a reduced viscosity at 25° C. of at least 0.01 measured as a 0.2 gram sample of the product in 100 ml. of dimethylformamide.

9. The product claimed in claim 8 wherein $R^4$ and $R^6$ are chlorine groups.

References Cited in the file of this patent

UNITED STATES PATENTS

| | | |
|---|---|---|
| 2,890,206 | Kraiman | June 9, 1959 |
| 2,890,207 | Kraiman | June 9, 1959 |
| 2,971,944 | Chow et al | Feb. 14, 1961 |